United States Patent
Claes

(10) Patent No.: US 11,055,414 B2
(45) Date of Patent: Jul. 6, 2021

(54) METHOD FOR A SECURED START-UP OF A COMPUTER SYSTEM, AND CONFIGURATION COMPRISING A COMPUTER SYSTEM AND AN EXTERNAL STORAGE MEDIUM CONNECTED TO THE COMPUTER SYSTEM

(71) Applicant: Fujitsu Technology Solutions Intellectual Property GmbH, Munich (DE)

(72) Inventor: Heinz-Josef Claes, Munich (DE)

(73) Assignee: Fujitsu Technology Solutions Intellectual Property GmbH, Munich (DE)

( * ) Notice: Subject to any disclaimer, the term of this patent is extended or adjusted under 35 U.S.C. 154(b) by 171 days.

(21) Appl. No.: 16/095,911

(22) PCT Filed: Dec. 1, 2017

(86) PCT No.: PCT/EP2017/081232
§ 371 (c)(1),
(2) Date: Oct. 23, 2018

(87) PCT Pub. No.: WO2018/114292
PCT Pub. Date: Jun. 28, 2018

(65) Prior Publication Data
US 2021/0034750 A1    Feb. 4, 2021

(30) Foreign Application Priority Data
Dec. 22, 2016  (DE) ...................... 10 2016 125 416.9
Mar. 21, 2017  (DE) ...................... 10 2017 106 042.1

(51) Int. Cl.
*G06F 21/57*    (2013.01)
*G06F 21/60*    (2013.01)
(Continued)

(52) U.S. Cl.
CPC .......... *G06F 21/575* (2013.01); *G06F 21/602* (2013.01); *G06F 21/725* (2013.01); *G06F 21/74* (2013.01); *G06F 2221/2107* (2013.01)

(58) Field of Classification Search
CPC ...... G06F 21/575; G06F 21/602; G06F 21/74; G06F 2221/2107; G06F 21/34; H04L 9/0897; H04L 9/0822
See application file for complete search history.

(56) References Cited

U.S. PATENT DOCUMENTS 7,934,104 B2 * 4/2011 Jones ..................... G06F 21/125
    713/189
8,868,898 B1 * 10/2014 Van Hoof ............. G06F 21/575
    713/2

(Continued)

FOREIGN PATENT DOCUMENTS

EP    1 387 237 A2    2/2004
WO    2015/030742 A1    3/2015

OTHER PUBLICATIONS

"How to Use a USB key to Unlock a BitLocker-Encrypted PC"—Chris Hoffman, How-To Geek, Jul. 19, 2016 https://www.howtogeek.com/262744/how-to-use-a-usb-key-to-unlock-a-bitlocker-encrypted-pc/ (Year: 2016).*

(Continued)

*Primary Examiner* — Randy A Scott
(74) *Attorney, Agent, or Firm* — DLA Piper LLP (US)

(57) ABSTRACT

A method of starting-up a computer system includes accessing a second storage area of a storage in which program data are stored; loading and executing the program data from a second storage area; mounting an external storage medium connected to the computer system, wherein a file system key that decrypts a file system data is stored on an external storage medium, wherein the file system key is encrypted on the external storage medium; loading the encrypted file (Continued)

system key from the external storage medium into the computer system; decrypting the encrypted file system key by a key stored in the second storage area; setting the decrypted file system key in a cryptographic module established by the start-up process; and decrypting and loading file system data of the encrypted file system by the cryptographic modules by the set file system key, whereby the computer system is started up completely.

11 Claims, 8 Drawing Sheets

(51) Int. Cl.
    *G06F 21/74*     (2013.01)
    *G06F 21/72*     (2013.01)

(56) References Cited

U.S. PATENT DOCUMENTS

| | | | |
|---|---|---|---|
| 9,239,802 B1* | 1/2016 | Wong | G06F 21/62 |
| 10,891,138 B2* | 1/2021 | Valasek | G06F 21/34 |
| 2003/0070083 A1 | 4/2003 | Nessler | |
| 2008/0212781 A1* | 9/2008 | Vennelakanti | G06F 21/6218 |
| | | | 380/277 |
| 2012/0079287 A1 | 3/2012 | Leclercq | |
| 2012/0331304 A1 | 12/2012 | She et al. | |

OTHER PUBLICATIONS

"BitLocker Drive Encryption Security Policy"—BitLocker Security Policy, Aug. 31, 2011 https://csrc.nist.gov/csrc/media/projects/cryptographic-module-validation-program/documents/security-policies/140sp1054.pdf (Year: 2011).*

"Minimal instructions for installing arch linux on an UEFI system with full system encryption using dm-crypt and luks," GitHubGist, 2016, https://gist.github.com/mattiaslundberg/8620837/81b048ac6569a98fe015eb42d78dba0c4f6d93a1.

"Installing Parabola on Libreboot with full disk encryption (including /boot)," Parabola Wiki, 2016, https://wiki.parabola.nu/index.php?title=Installing_Parabola_on_Libreboot_with_full_disk_encryption_(including_/boot)&oldid=18003.

"Cryptography behind chip based credit card (smart cards)?," StackExchange Information Security, 2014, https://security.stackexchange.com/questions/49280/cryptography-behind-chip-based-credit-cards-smart-cards.

* cited by examiner

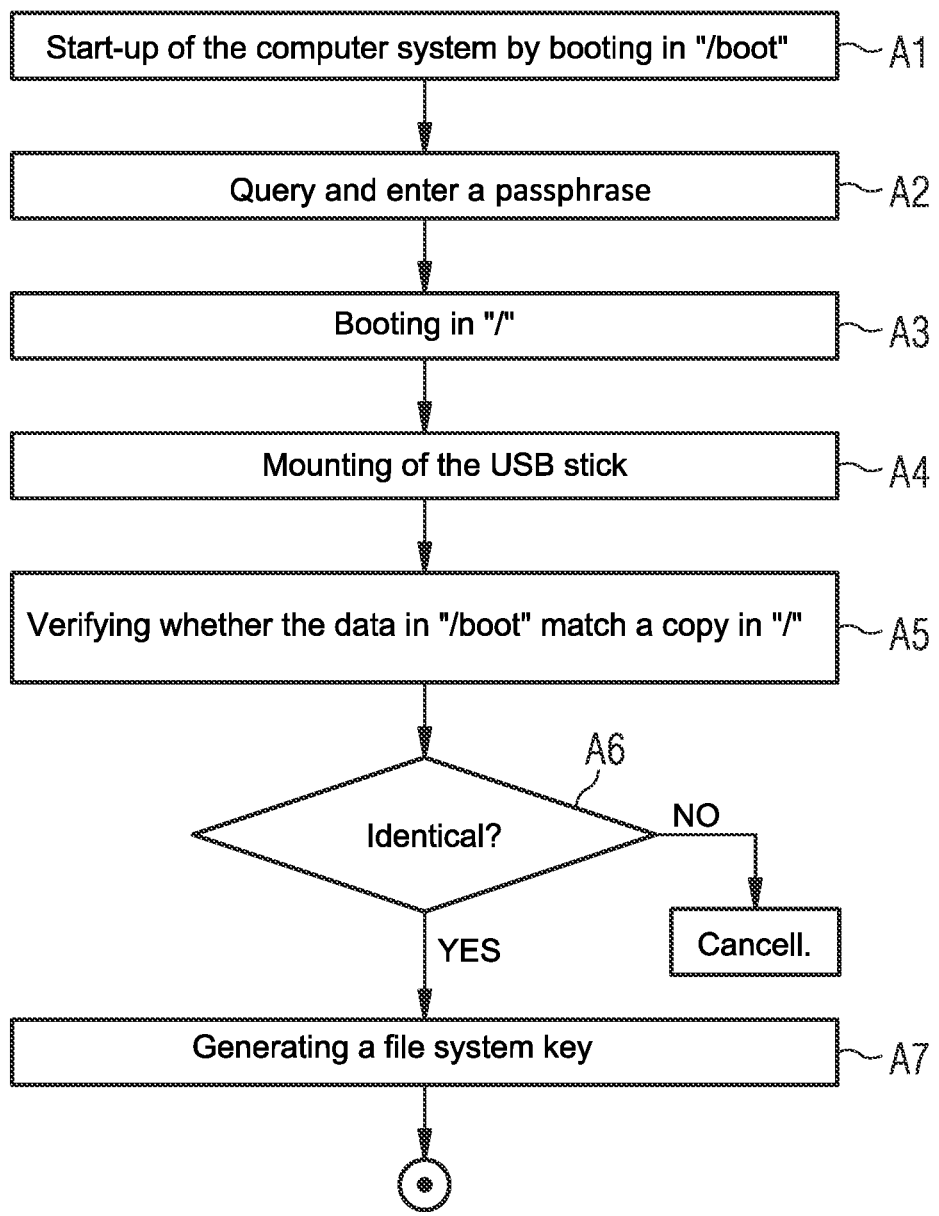

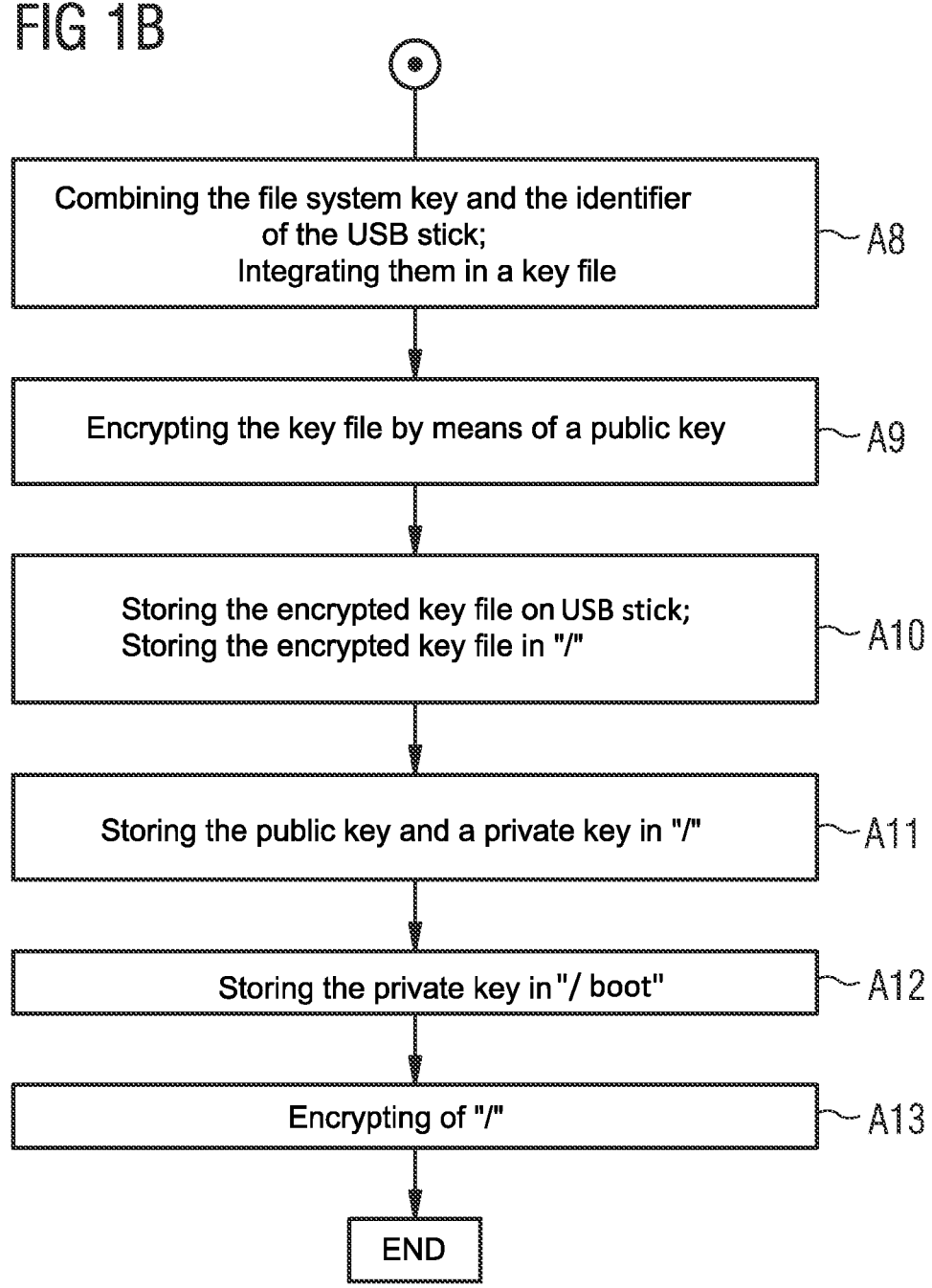

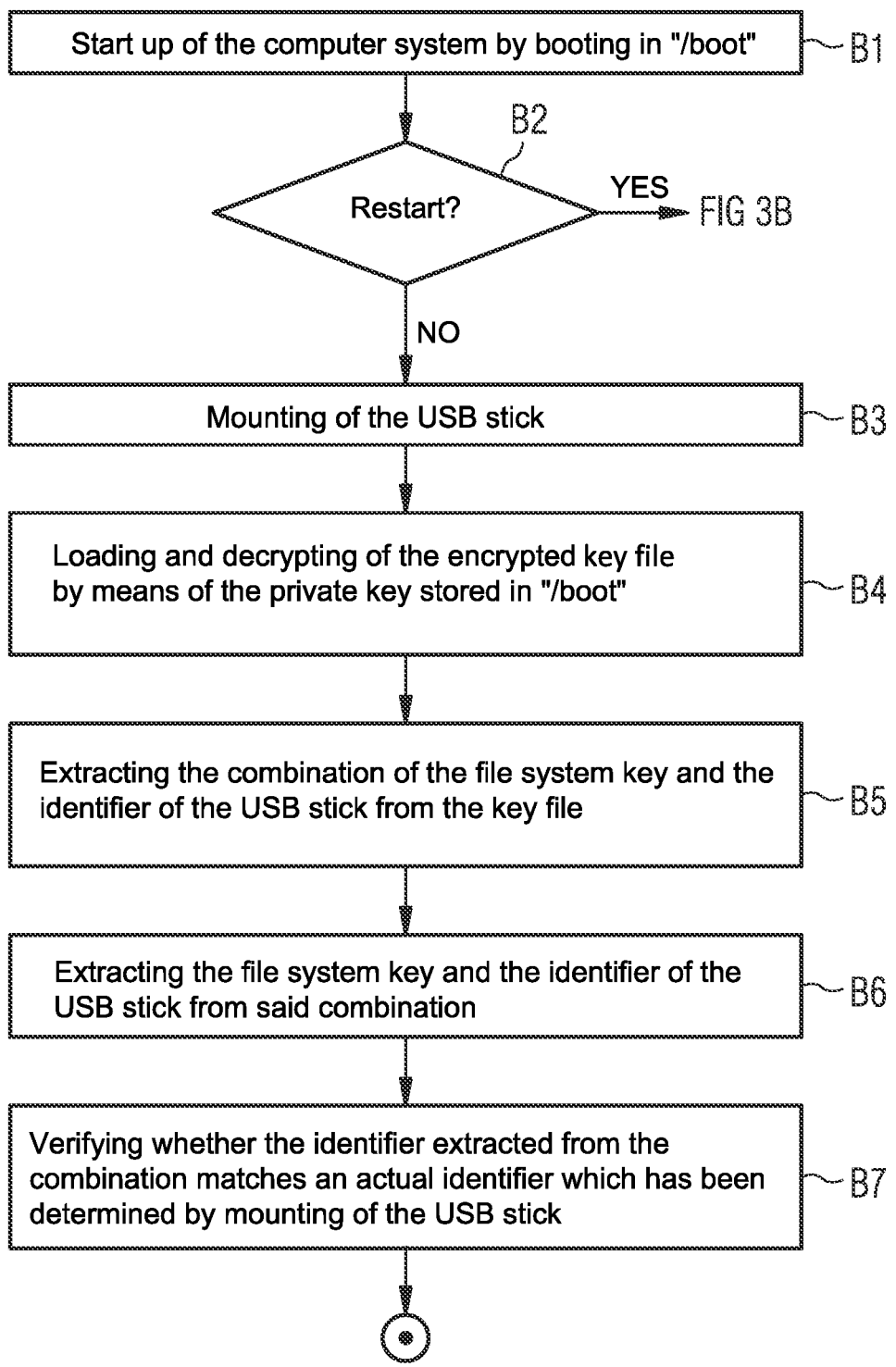

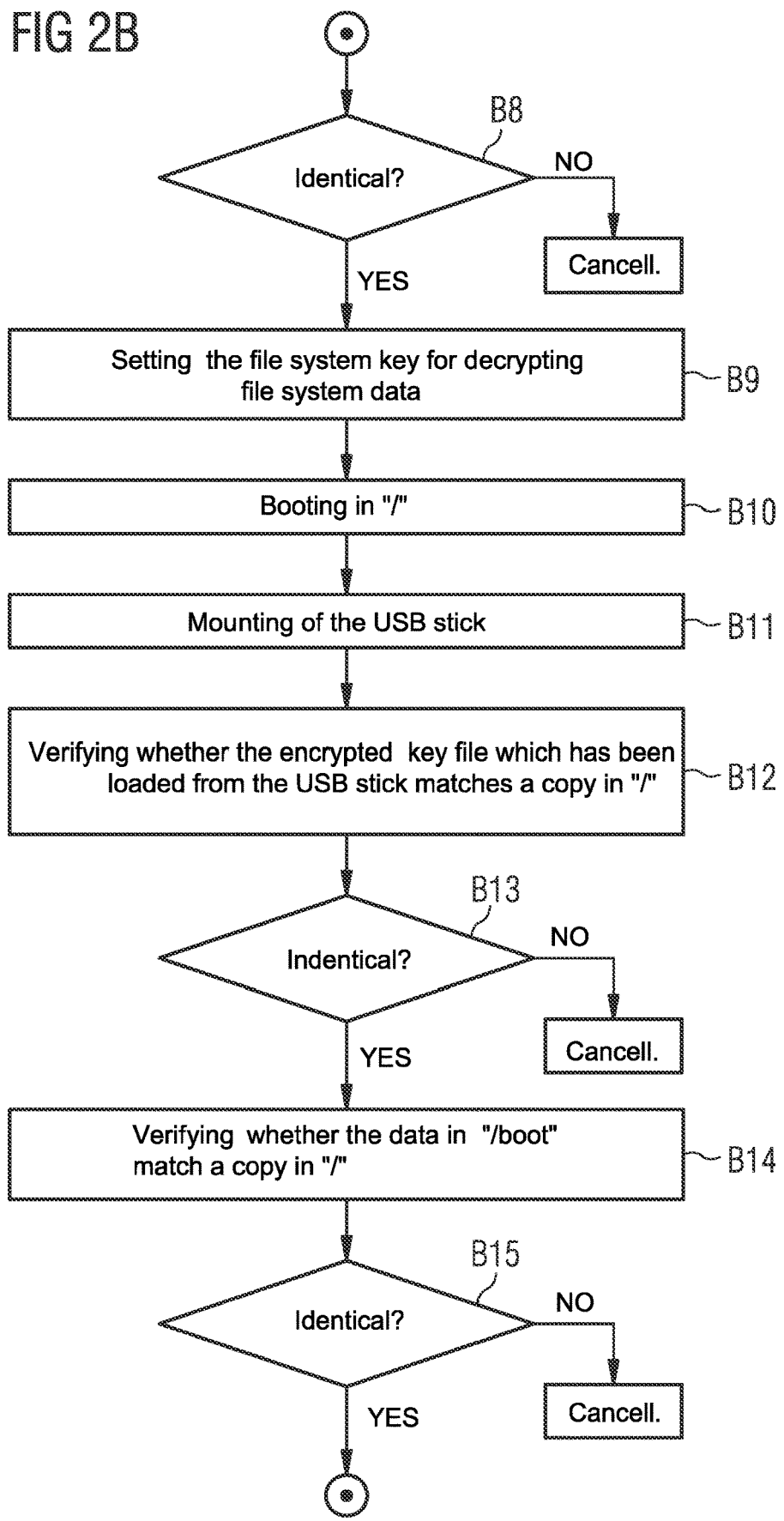

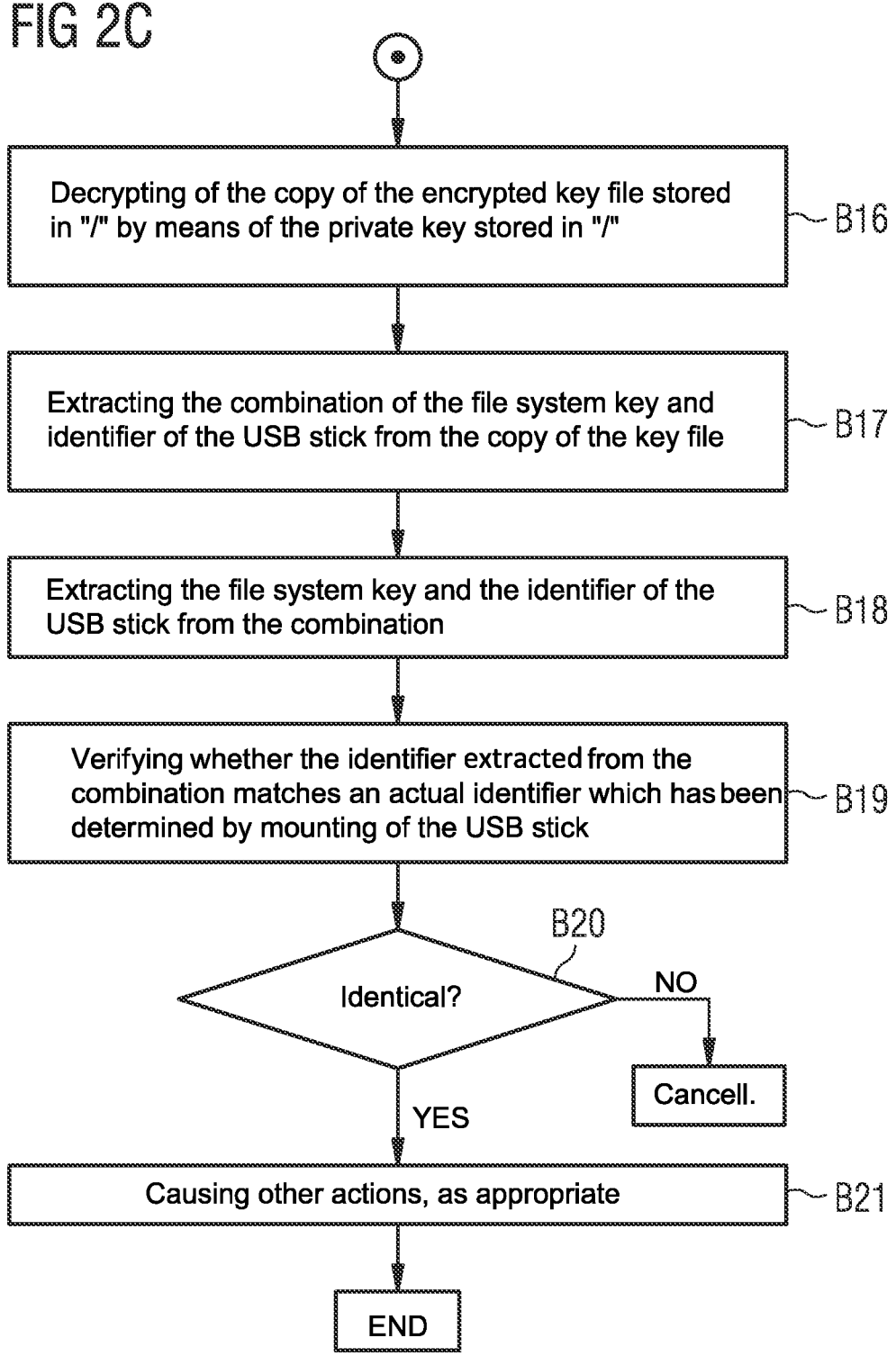

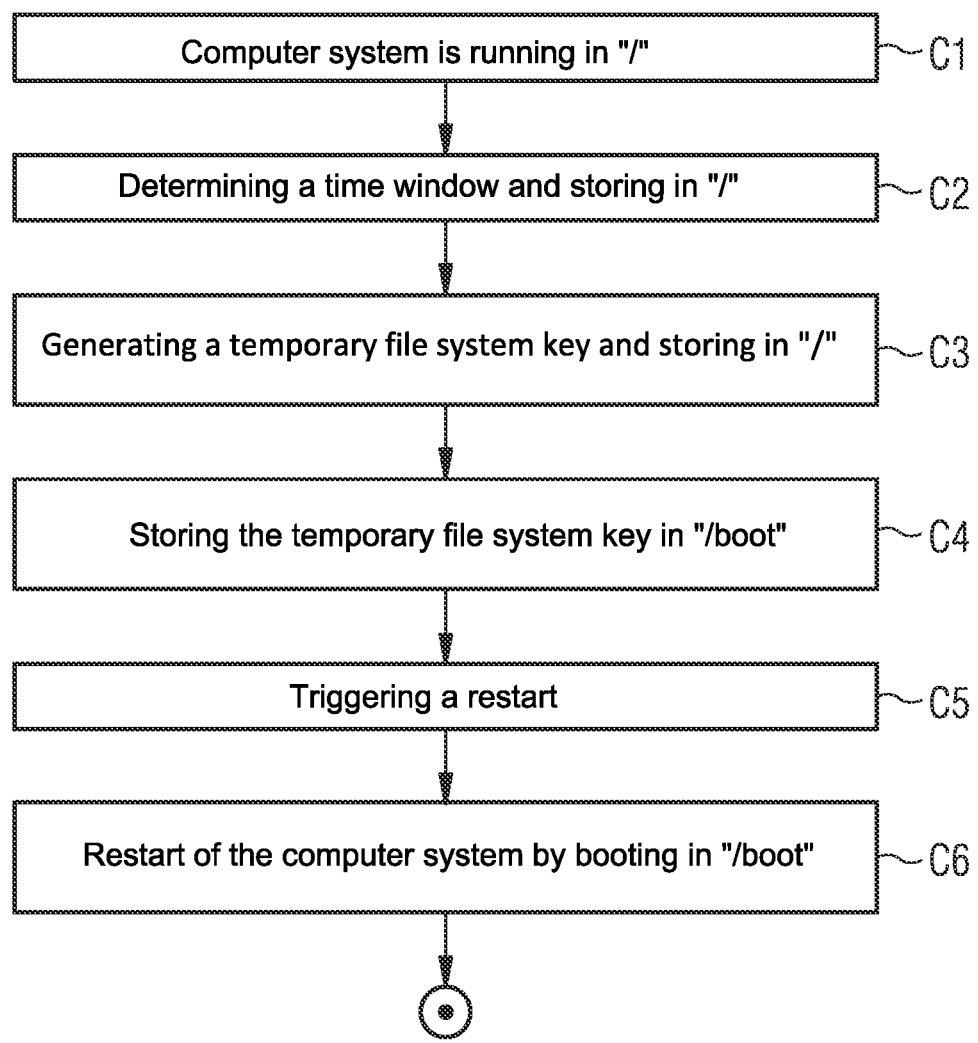

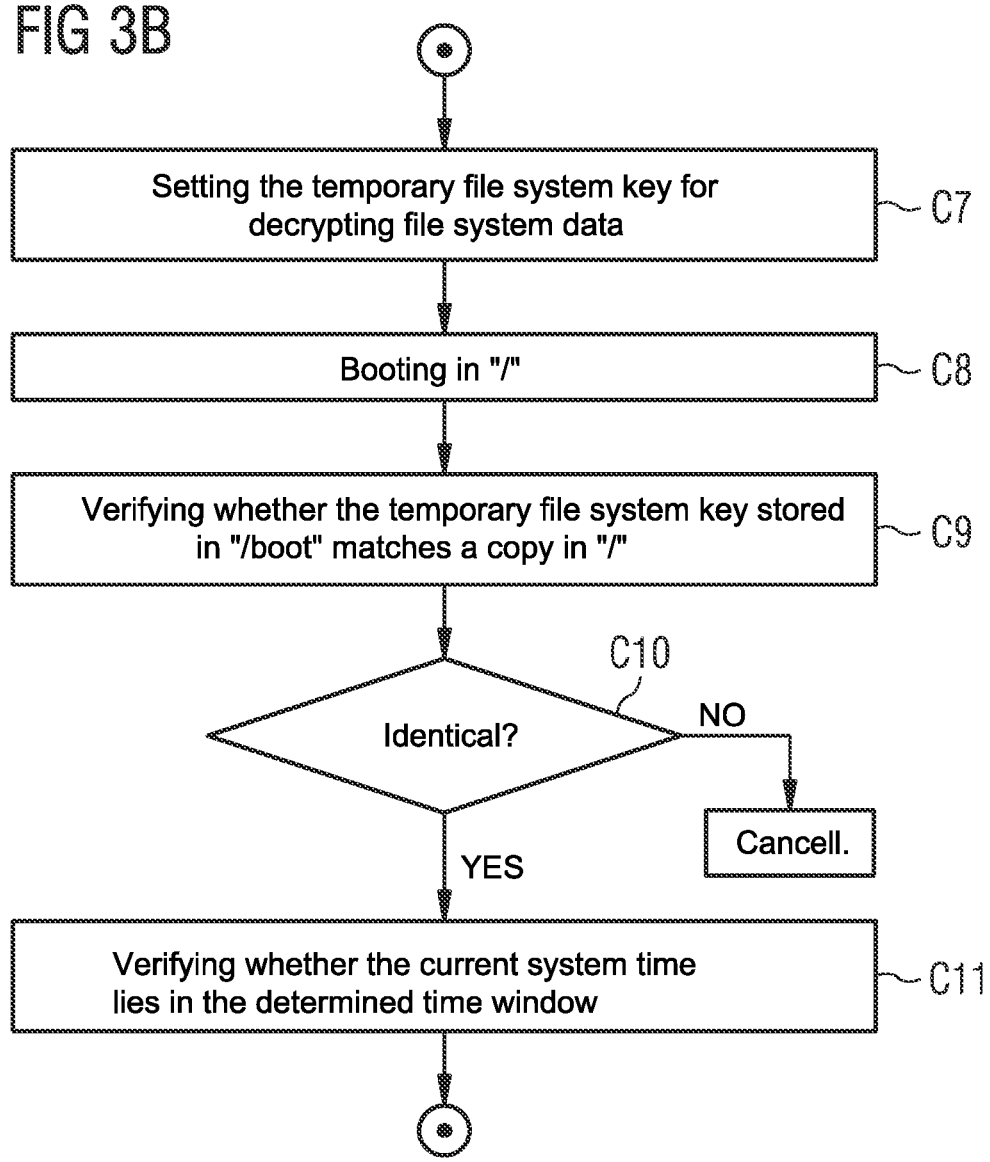

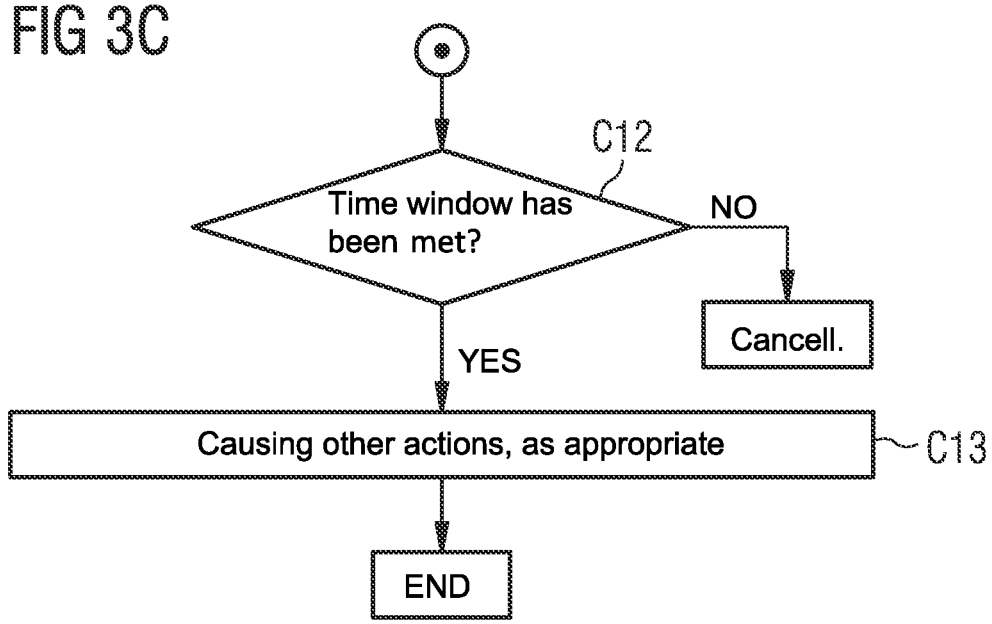

METHOD FOR A SECURED START-UP OF A COMPUTER SYSTEM, AND CONFIGURATION COMPRISING A COMPUTER SYSTEM AND AN EXTERNAL STORAGE MEDIUM CONNECTED TO THE COMPUTER SYSTEM

TECHNICAL FIELD

This disclosure relates to a method for a secured start-up of a computer system including an encrypted file system stored in a storage in the computer system and a method that provides measures for a secured start-up of such a computer system. The disclosure also relates to a configuration comprising a computer system and an external storage medium, connected to the computer system, and the usage of an external storage medium for a method mentioned above.

BACKGROUND

To start up a computer system including an encrypted file system stored in a storage within the computer system, that is, to boot the computer system and load the file system, it is required to activate or set a key (i.e., passphrase, password, watchword, keyword, codeword, word) during the start-up operation. With the activated or set key file, system data of the encrypted file system may be decrypted and loaded. Hereto, in general a password has to be entered by a user during the start-up operation. Conventionally, the password is entered by a keyboard connected to the computer system, and controlled by an input mask displayed on the connected monitor, where appropriate.

This way, in conventional applications of starting up an encrypted file system a user is required who knows the correct password. A disadvantage of that procedure is that the user may be a criminal or may be bribable, or the password may be stolen by a criminal third-party. It is, for example, possible that a criminal third-party obtains the password by manipulation, while it is input by an authorized user on the keyboard, for example, by a so-called keylogger.

A further disadvantage of the known method is that at least a keyboard and a monitor, where appropriate, have to be connected to the computer system. A disadvantage thereof is the required space, which is needed for a keyboard and/or a monitor. In addition, in particular, when the keyboard is permanently connected to the computer system, this may be problematic due to security reasons regarding an access protection of the computer system. As hereby an input feature is provided, for example, for a log-on by users, and thus a possibility of manipulation and/or a general possibility of action, which may not be desired or which has to be prevented. Especially regarding safety critical computer systems, connecting a keyboard may imply a security risk. On the other side it is required, as described above, to set a password to start up an encrypted file system during a start-up operation.

There are already solutions for an automated decryption of an encrypted file system during a start-up operation of the computer system by an external storage medium connected to the computer system, e.g. a USB stick. Hereto, a respective key for automated decryption of the encrypted file system is stored on the external storage medium. When the external storage medium is connected to the computer system, the computer system may access the external storage medium during a start-up operation, load the key from the external storage medium into the computer system, and decrypt file system data of the encrypted file system with the key, thus the computer system starts up completely.

Such kinds of solutions are however problematic when an unauthorized third party gains access to the external storage medium (e.g. by theft or by negligence of an authorized user) and thus obtains the key stored thereon, for example, by connecting the external storage medium to an alien computer system. When the key in plain text gets in the hands of a non-authorized third-party, the non-authorized third-party is able to decrypt the encrypted file system during a start-up procedure of the computer system, or remove the storage of the computer system, in which the encrypted file system is stored, integrate it in an alien computer system and read it out with the key.

There is thus a need to provide measures for a secured start-up of the computer system including an encrypted file system that enable an enhanced process and a more robust protection against manipulations.

SUMMARY

I provide a method for a secured start-up of a computer system including an encrypted file system stored in a first storage area of a storage in the computer system, wherein the method includes steps automatically executed during start of the computer system: triggering a start-up process of the computer system by accessing a second storage area of the storage in which the program data required for the start-up process are stored, loading and executing the program data required for the start-up process from the second storage area, mounting an external storage medium that is connected to the computer system, wherein a file system key that decrypts the file system data of the encrypted file system is stored on the external storage medium, wherein the file system key is encrypted on the external storage medium, loading the encrypted file system key from the external storage medium into the computer system, decrypting the encrypted file system key by a key, which is stored in the second storage area, setting the decrypted file system key in a cryptographic module established by the start-up process, and decrypting and loading file system data of the encrypted file system by the cryptographic modules by the set file system key, whereby the computer system is started up completely.

I also provide a method of providing measures for a secured start-up of a computer system including a file system stored in a first storage area of a storage in the computer system, wherein the method includes steps automatically executed during running operations of the started up computer system: mounting an external storage medium connected to the computer system, generating a file system key for a later decryption of file system data of the file system, which is stored in the first storage area of the storage, encrypting the generated file system key, storing the encrypted file system key on the external storage medium, and storing a key in a second storage area of the storage in the computer system for decrypting the encrypted file system key, which is stored on the external storage medium.

I further provide a configuration including a computer system and an external storage medium connected to the computer system, wherein the computer system includes a storage including a first storage area and a second storage area, an encrypted file system is stored in the first storage area and program data required for a start-up process of the computer system are stored in the second storage area, and wherein a file system key is stored on the external storage medium for decrypting file system data of the file system, which are stored in the first storage area of the storage, and the file system key is encrypted on the external storage medium, wherein further a key is stored in the second storage area of the computer system, which is provided to decrypt the file system key, which is stored on the external storage medium, the computer system is configured to load the encrypted file system key from the external storage medium into the computer system to decrypt the encrypted file system key by the key, which is stored in the second storage area of the computer system, and finally decrypt and load the file system data of the encrypted file system by the decrypted file system key, as appropriate.

I yet further provide a method of using an external storage medium for the method for a secured start-up of a computer system including an encrypted file system stored in a first storage area of a storage in the computer system, wherein the method includes steps automatically executed during start of the computer system: triggering a start-up process of the computer system by accessing a second storage area of the storage in which the program data required for the start-up process are stored, loading and executing the program data required for the start-up process from the second storage area, mounting an external storage medium that is connected to the computer system, wherein a file system key that decrypts the file system data of the encrypted file system is stored on the external storage medium, wherein the file system key is encrypted on the external storage medium, loading the encrypted file system key from the external storage medium into the computer system, decrypting the encrypted file system key by a key, which is stored in the second storage area, setting the decrypted file system key in a cryptographic module established by the start-up process, and decrypting and loading file system data of the encrypted file system by the cryptographic modules by the set file system key, whereby the computer system is started up completely, including storing a file system key for decrypting file system data of an encrypted file system in a computer system on the external storage medium, wherein the file system key is encrypted on the external storage medium.

BRIEF DESCRIPTION OF THE DRAWINGS

FIG. 1A is a schematic diagram of method steps of a method of providing measures for a secured start-up of a computer system.

FIG. 1B is a schematic diagram of further method steps of the method according to FIG. 1A.

FIG. 2A is a schematic diagram of method steps of a method for a secured start-up of the computer system.

FIG. 2B is a schematic diagram of further method steps of the method according to FIG. 2A.

FIG. 2C is a schematic diagram of further method steps of the method according to FIGS. 2A and 2B.

FIG. 3A is a schematic diagram of method steps of a method for a secured start-up of the computer system.

FIG. 3B is a schematic diagram of further method steps of the method according to FIG. 3A.

FIG. 3C is a schematic diagram of further method steps of the method according to FIGS. 3A and 3B.

| List of Reference Numbers | |
|---|---|
| A1 to A13 | steps of the method |
| B1 to B21 | steps of the method |
| C1 to C13 | steps of the method |

DETAILED DESCRIPTION

I provide a method that enables a secured start-up of the computer system including an encrypted file system stored in a first storage area of the storage in the computer system. The method comprises the following steps, which are automatically executed during start-up of the computer system:
triggering a start-up process of the computer system by accessing a second storage area of the storage, in which program data required for the start-up process are stored,
loading and executing the program data required for the start-up process from the second storage area,
mounting an external storage medium connected to the computer system, wherein a file system key for decryption of the file system data of the encrypted file system is stored on the external storage medium, wherein the file system key is encrypted on the external storage medium,
loading the encrypted file system key from the external storage medium into the computer system,
decrypting the encrypted file system key by using a key, which is stored in a second storage area,
setting the decrypted file system key in a cryptographic module established by the start-up process, and
decrypting and loading file system data of the encrypted file system by the cryptographic module with the set file system key, whereby the computer system is started up completely.

In such a method, file system data of the encrypted file system in the computer system are automatically decrypted for a start-up of the computer system without any user input being required. That means that no user who knows the respective key or password is required, who may be criminal, bribable or open to blackmail. Further, also a manipulation of an input of the key by a keyboard and/or an unauthorized tapping of the key during such an input is prevented, because there is no such kind of input.

To perform the method described above, a file system key is used, which is stored on an external storage medium. Hereto, the external storage medium is connected to the computer system. The external storage medium may, for example, be a USB-stick, an SD-card or an external hard disk. Due to safety reasons it is advantageous to connect the external storage medium to the computer system only when executing the method described here. In particular, after performing the method (e.g. after a complete startup of the computer system or already after loading the encrypted file system key from the external storage medium into the computer system) the external storage medium is to be removed from the computer system again. This prevents both devices (the external storage medium and the computer system) from being physically accessed at the same time (and no control may be provided). However, as an alternative, it is also possible that the external storage medium is permanently connected to the computer system.

As opposed to traditional solutions, in my method, the file system key itself is also encrypted. A key that decrypts the file system key on the external storage medium is stored in a storage area in the storage of the computer system, which may be accessed during the start-up operation. This way, the loaded file system key may be automatically decrypted, thus again a decryption of file system data of the encrypted file system is enabled by the decrypted file system key.

The advantage of this method compared to traditional solutions is that the file system key on the external storage medium may not be read in plain text, for example, by reading out the content of the external storage medium on an alien computer system. The encrypted file system key, which is stored on the external storage medium, may thus only be used in combination with the predetermined computer system, in which the appropriate key that decrypts the file system key is stored, thus the method steps mentioned above for decrypting file system data and starting up the computer system may be executed. This way, it is prevented that a non-authorized third-party is using the file system key in plain text to decrypt the encrypted file system by entering the file system key during the start-up operation or by removing the storage and installing the storage in another computer system, and applies the file system key.

The method thus enables a fully automated start-up process of a computer system including an encrypted file system, wherein the process is protected against any non-authorized access to the required file system key. The used external storage medium thus acts as safe key that performs decryption of file system data of the encrypted file system.

The method may, for example, be used for a computer system which is a dedicated system that establishes a safe connection (e.g. VPN connection) to one or more other computer systems (e.g. servers). For example, the computer system may be a kind of "encryption box" or "encryption router" (e.g. router including VPN functionality), wherein the method enables a secured start-up of the system to establish a secure connection. In the encrypted file system connection keys (in particular VPN keys) or other authentication data may be stored, for example. The encryption of the file system protects the connection keys against manipulation. In addition, the encrypted file system may also comprise the operating system. In this case, encryption of the file system prevents or hampers access to connection keys by a manipulation of operating system files. It is possible to operate the computer system in a subsidiary of a company and establish a secure connection to one or more centralized server(s) of the company during start-up. The external storage medium, which acts as safe key, may, for example, be used by employees of the subsidiary to automatically start up the system. Other intended uses and forms of the computer system are of course also possible and are not excluded by the descriptions above.

It is possible that only the file system in the first storage area of the storage is encrypted and other data in the first storage area of the storage are not encrypted. As an alternative it is possible that the complete first storage area is encrypted, thus any data (file system and other data, as appropriate) are encrypted in the first storage area. A plurality of file systems may be stored in the storage. The files systems may all be encrypted or only single file systems may be encrypted. It is possible that a plurality of file systems is encrypted by using different file system keys or by using a unique file system key. Depending on the design above, the plurality of file systems may be stored in one or more defined storage areas. The term "storage area" may be a predefined partition of the storage or may only define an (address) area of the storage, in which determined data (e.g. file system data) are stored.

It is possible that the method mentioned above is applied to a plurality of encrypted file systems. Hereto, different external storage media may be used that include one or more different file system key(s). However, it is also possible to use an external storage medium to start and boot a plurality of encrypted file systems that include one or more different file system key(s).

The program data required for the start-up process may, for example, comprise a dedicated start program (a so-called boot loader). In addition, the program data required for the start-up process may comprise operating system data (an operating system kernel). For example, the operating system data are loaded by the boot loader. The start-up process of the computer system is, for example, triggered by a BIOS (Basic Input/Output System). The BIOS may access the second storage area of the storage and load the programs required for a start-up there.

By the last step of the method described above, file system data of the encrypted file system are decrypted and may be loaded into the main memory upon request (as required). The file system data comprise at least data that are required for a complete start-up of the computer system. Such data may, for example, be further operating system data (in addition to operating system data in the second storage area), program data, user data (e.g. login information) or the like. In encrypted form, the file system data are of no use (or unsuccessfully) as it is not possible to execute a processing in a way to enable a successful start-up of the file system. Only in decrypted form (that is, in plain text) the file system data may be loaded and executed successfully, thus the computer system may start up completely.

The term "cryptographic module" comprises a cryptographic program or a portion of a cryptographic program (part of the program) or one or more threads (e.g. kernel thread) to process the cryptographic tasks (encryption or decryption).

The term "decryption" generally denotes that one or more components (e.g. a cryptographic module) of the computer system may access file system data stored in the first storage area, by the file system key, which has been passed on thereto (and thus may boot the file system, for example) to read and/or write data. Decrypting the encrypted file system data may be performed in a dedicated cryptographic module (e.g., for Linux systems in the module "dm-crypt") or in a key management program (e.g., for Linux systems in the so-called "Linux Unified Key Setup", acronym "LUKS") by a so-called master key. Hereto, a symmetric cryptographic method may be used. The master key decrypts and/or encrypts file system data. As an alternative, an asymmetric cryptographic method may be used. The encryption is performed by the first master key (generally called public key) and a decryption by a second master key that differs from the first key (generally called private key). In both methods a set master key is generated from the file system key, created by the file system key itself or is a key separate from the file system key, that is encrypted and/or decrypted by the file system key.

Thus, without decryption of the encrypted file system data in the computer system by the set file system key, starting up of the computer system is inhibited. An unauthorized third party is not able to access the computer system and possibly private content in the file system.

By the last step of the method, the computer system is completely booted and then in an executable (running) operation, in which the file system may be accessed. A decryption of file system data of the encrypted file system may imply that the complete file system in the storage is decrypted during the start-up process. Alternatively, however, it is not feasible to decrypt the complete encrypted file system—last but not least due to performance and security reasons—but only set the file system key in a cryptographic module which is set up as a cryptographic layer between running operating system processes and the encrypted file system in the first storage area of the storage. This way, file system data, requested by running processes, may be automatically processed by the cryptographic layer of the cryptographic module. Thus, the running processes are able to read the data and may be loaded in main memory, for example.

Apart from that, the file system data are kept in encrypted form in the first storage area of the storage. File system data that have been loaded into main memory and are not required anymore will be written back to the file system in the first storage area of the storage in an encrypted way (by the cryptographic layer).

Advantageously, the second storage area is to be protected against manipulations. For example, this may be achieved by setting a password against non-authorized access to the storage of the computer system (also in a dismantled state).

It is also advantageous to additionally secure the start-up process by setting a BIOS password, where appropriate. This way, a BIOS manipulation or an undesired modification of settings within the BIOS becomes difficult. It is also advantageous to make a physical access to the file system more difficult or to make it at least visible by sealings.

The file system key may be stored in a key file on the external storage medium. In addition to the file system key, the key file includes an identifier of the external storage medium. While the method is executed, the key file is loaded from the external storage medium into the computer system. In addition, the following step may be executed: verifying whether the identifier of the external storage medium included in the key file matches the actual identifier, which has been determined by mounting the external storage medium.

By the measures described above, the file system key is linked to an identifier of the external storage medium. This way, the file system key is associated to an external storage medium to be used for the method. The file system key may be combined with the identifier by a dedicated combination method. As an appropriate identifier the serial number of the external storage medium may be used, for example. As an alternative or in addition to the identifier, the key file may also include other information and may be combined with the file system key where appropriate, for example, an arbitrary string (e.g., a given name of the external storage medium, a username or the like).

By associating the file system key to an identifier or other information stored in the key file, thus simply copying the key file to another external storage medium becomes difficult. Due to matching and verifying whether the identifier or other information stored in the key file matches the actual identifier determined by mounting the used external storage medium or other information stored in the computer system, it may be determined already during the start-up process whether the storage medium to be used or another storage medium is used. If the identifier stored in the key file differs from the actual identifier determined by mounting of the external storage medium, it is determined that another storage medium than the medium to be used is used. Otherwise, the storage medium used is approved as the anticipated storage medium. In addition to the identifier, the same is true for any other stored information.

The described measures of an association of the file system key with an identifier of the external storage medium and/or with other described information and verifying the identity of the matched identifiers or of other information thus prevent (or make it at least complicated) a usage of the file system key by copying to an external storage medium that differs from the storage medium to be used. This prevents the file system key or the key file itself from being copied in a non-authorized way.

It is possible to encrypt the complete key file (and not only the file system key) on the external storage medium. Thus, other data are encrypted within the key file in addition to the file system key. In this case, the encrypted key file may be loaded during the start-up process from the external storage medium in the computer system and may be decrypted by the key stored in the second storage area. Thus, the file system key may be used to decrypt file system data—as described above. In addition, the identifier stored in the key file is verified after decrypting of the encrypted key file.

An encryption of the complete key file provides the advantage that a modification of the key file becomes very difficult. This way, further stored information, which is stored in addition to the file system key in the key file, is protected against manipulation.

For example, an identifier stored in the key file is protected against a manipulative adaption to an identifier of an alien storage medium, thus the above process of verifying the identity of the used identifiers may hardly be manipulated.

The key file or just the file system key (when used without a key file) should have a predetermined name to be stored on the external storage medium in a unique way and to be located during execution of the method. The name may always be the same, and arbitrarily selected in parts or completely. Alternatively, the key file or the file system key may also be stored in another way, for example, between partitioned portions on the external storage medium to virtually "hide" the key file or the file system key. Thus, the information is not easily be detected by a non-authorized third party.

It may make sense to encode a hardware information of the used computer system in the name of the key file or the file system key. Advantageously an information is used hereto, which is not available external of the device to make the assignment of the external storage medium to a dedicated computer system by third parties more difficult. For example, a serial number of the external storage medium may be appropriate. Alternatively or complementarily, a random number may also be used, which is stored in the file system. The random number may be associated with other information, as appropriate. Then, also a single external storage medium may be used to decrypt different file systems and maybe of several different computer systems, if desired.

The following further steps may be performed after a complete start-up of the computer system:
loading a copy of the key file stored in the file system, and verifying whether the key file loaded from the external storage medium matches the loaded copy of the key file.

Before performing the measures the following additional steps may be performed, as appropriate:
integrating the external storage medium that is connected to the computer system into the started-up file system, and loading the key file from the external storage medium in the started-up computer system.

The last steps described above are required if after a complete start-up of the computer system, the external storage medium has to be re-mounted in the now started-up file system.

As an alternative, the measures in that example of the method may only be applied to the file system key (and not to the complete key file). In that example the following steps are performed:
loading a copy of the encrypted (or not encrypted) file system key stored in the file system, and verifying whether the encrypted file system key (that has subsequently been decrypted), which has been loaded from the external storage medium, matches the loaded copy of the encrypted (or not encrypted) file system key.

Also here, the following additional steps may be performed, where appropriate, before performing those measures:

mounting the external storage medium, which is connected to the computer system, in the started-up file system, and reloading the encrypted file system key from the external storage medium into the started-up computer system.

To perform the measures described above, a copy of the encrypted or not encrypted key file or of the encrypted or not encrypted file system key is stored in the file system in the first storage area of the storage in the computer system. It is not or hardly possible to access the copy without the method of decrypting the file system data by the external storage medium, described above, as the file system is encrypted within the computer system. This way, the copy that is pre-stored in the encrypted file system, is protected against manipulations.

The copy pre-stored in the file system (depending on whether it comprises the encrypted or not encrypted key file or the encrypted or not encrypted file system key) is compared to the version of the encrypted or decrypted key file or the encrypted or decrypted file system key from the external storage medium. The verification whether the key file or the file system key on the external medium matches the copy pre-stored in the file system, is a security barrier, which is verified by the computer system including the started-up file system. The started-up computer system verifies whether the key file or the file system key on the external storage medium matches a respective image, which has been created before (e.g. during a preparation process of the method described) in the running file system of the started-up computer system.

Thus, the started up computer system may detect a manipulation of the key file or the file system key on the external storage medium, even if such a kind of manipulation was not detected during the start-up process (loading and decrypting of the file system key or the key file and verifying an identifier of the external storage medium, where appropriate), for example, because the start-up process itself has been manipulated.

At least while executing the measures described above, after the complete start-up of the computer system (wherein the file system key has been set for a decryption of file system data, thus the file system may be loaded at least partly in a non-encrypted mode), it is possible to limit the user access to the computer system to predetermined users or prohibit any access at all. The latter may be realized, for example, if no log-on option to the file system is provided (e.g., by a shell or console). This way, no user may log on to the computer system. Thus, an access opportunity to the file system is prevented or made extremely difficult.

In an example of the configuration above, the method comprises the further steps: extracting an identifier of the external storage medium from a loaded copy of the key file stored in the file system, and verifying whether the identifier extracted from the copy of the key file matches an actual identifier, which has been determined by mounting the external storage medium, which is connected to the computer system, into the started-up file system.

When in that example of the method the copy of the key file is encoded itself (e.g., by the same key with which the key file is encrypted on the external storage medium, where appropriate, see above), at first the following steps are performed:

loading a key stored in the file system (that may correspond to the key by which the key file, which is loaded from the external storage medium, is also decrypted, see above), and decrypting the loaded copy of the encrypted key file in a decrypted copy of the key file by the loaded key.

The identifier may then be extracted and verified from the decrypted copy of the key file. By matching an identifier stored in the copy of the key file with the identifier of the used external storage medium by the started-up computer system, not only in general a manipulation of the key file or of the file system key on the external storage medium may be detected. In particular, it may be verified whether exactly the external storage medium is used for the method, which has been used during setup the process, that is, onto which the key file or the file system key has been stored before.

A manipulation of the start-up process of the methods described above may be possible in a way that the key file has been copied to an alien external storage medium and the second (non-encrypted) storage area of the computer system is manipulated to impact a verification of the identifier of the used external storage medium and/or a matching of an identifier, that is stored in the key file during the start-up process—as described above.

It is also possible to obtain the key to decrypt the encrypted key file on the external storage medium by a manipulation or reading of the second (non-encrypted) storage area. Then, the key may be decrypted and may be provided with a new identifier of the exchanged storage medium. Thus, it is not detected in a test during the start-up process. By decrypting the encrypted key file, the file system key may also be obtained in plain text, where appropriate. If however, the computer system, in particular the storage in the computer system, is protected against removing the storage to be decrypted in another computer system in a dedicated way (e.g. by a sealing), and the computer system prevents an input of the decrypted file system key to prevent a decryption external of the process flow, a non-authorized third-party may take the manipulation of the encrypted key file, described above, into account to manipulate the process and nevertheless achieve a (at least partial) decryption of the file system to obtain an access to data.

As a countermeasure against the described manipulation opportunities, the started-up computer system matches an identifier included in the pre-stored copy of the key file with the identifier of the used external storage medium. This way a deviation of the identifier stored in the key file, or an actual identifier, which has been determined during mounting of the external storage medium, from the identifier stored in the copy, is detected. Due to this measure, the process is thus protected against manipulation in a robust way.

The following further step may be performed after a complete start-up of the computer system:

verifying whether the program data within the second storage area matches a copy of the program data of the second storage area stored in the file system in the first storage area.

To perform that measure, a copy of the program data of the second storage area is stored in the file system of the first storage area in the computer system. It is not possible to access the copy without the measures of decrypting the file system data by the external storage medium, described above, as the file system is encrypted in the computer system. The verification measure described above indicates a manipulation of program data of the second storage area, if the program data of the second storage area differ from the copy in the file system in the computer system. Thus, it may be detected if program data of the second storage area have been modified. In addition, this measure also makes the process more secure and a manipulation thereof more complicated.

In the following, measures of preparing a restart of a computer system including an encrypted file system in a storage of the computer system are described. The measures may be applied as a specific example of the method described above. It is also possible to apply the measures as a separate individual method independently from a method described above. In the latter configuration, the method starts while the computer system is started up and provides a running file system.

After the complete startup of the computer system, the following steps of preparing a restart of the computer system are executed:

determining a time window having a predetermined start time and a predetermined end time, and storing the time window in the file system, generating a temporary file system key decrypting encrypted file system data or file system after a restart of the computer system, storing the temporary file system key in the second storage area, and triggering a restart of the computer system.

The steps enable preparation of a restart of the computer system. The determination of a time window having a predetermined start time and a predetermined end time provides a definition of a predetermined time period in which the restart is expected or in which the restart has to be executed to set the computer system in the normal operation mode including a completely started-up file system. The definition of a predetermined time window for a restart thus prevents or hampers manipulations of the restart processes. Manipulations that impact the restart process need a certain time and become apparent by verifying a predefined (comparatively short) time period. In particular, the following possible manipulations by which the temporary file system key is to be obtained, which is used for the restart for decrypting file system data, are prevented: switching off the computer system in case the computer system has just been shut down, and/or removing (and copying, if desired) the storage built into the computer system, onto which the encoded file system is stored.

In addition, it is advantageous to protect the computer system or a restart process by additional measures. Such kind of measures may, for example, comprise: an executed restart process should be controlled by a person physically present at the computer system, if possible so that the person would immediately notice when the restart process takes too long time, a BIOS password should be set to prevent manipulations of the system time of the computer system and other manipulations for circumventing the predefined time window, and the computer system (the physical casing of the computer system) should be sealed in a dedicated way, thus manipulations at the casing of the computer system, for example, removal of the internal storage, become apparent.

Generating and storing a temporary file system key facilitates decryption of file system data of the encrypted file system after a successful restart of the computer system. This also provides the advantage that the restart and a new complete start-up of the computer system may be automatically executed despite the encrypted file system without having to perform a dedicated process locally at the computer system itself. In particular, it is thus not required to pass a password to the computer system at the beginning of the restart operation by a user or—as described above in the context of a respective method—by an external storage medium. Thus, the measures are in particular advantageous for a restart of the computer system, which is triggered from a remote location, for example, by an administrator. In an example of the measures above, a copy of the temporary file system key is also stored in the file system before the step of triggering a restart of the computer system. The copy of the temporary file system key in the file system serves a later verification of the temporary file system key, as described in detail later.

The following steps may be executed by triggering a restart of the computer system:

shutting down the file system, wherein the file system is completely encrypted and stored in the first storage area, re-triggering the start-up process of the computer system by accessing the second storage area, in which the program data required for the start-up process are stored, loading and executing the program data required for the start-up process from the second storage area, loading the temporary file system key from the second storage area, setting the loaded temporary file system key in the cryptographic module setup by the start-up process, decrypting and loading the encrypted file system data of the file system by the cryptographic module by the temporary file system key, whereby the computer system is started up completely, reading of the current system time of the computer system, and verifying whether the current system time lies within the determined time window, which has been loaded from the file system.

By the measures mentioned above, the shutdown computer system is finally restarted, wherein a decryption of file system data of the encrypted file system in the computer system is automatically executed by the stored, loaded and applied temporary file system key. In addition, after the restart by the started up computer system, the current system time is read and checked, whether the current system time lies within the predetermined time window. This way, the manipulations mentioned above may be prevented or hampered. In addition, the computer system or the restart process is also to be protected by the measures mentioned above. If the predetermined time window is not observed, the computer system may be brought into a safe mode or shut down again, for example. The safe mode may, for example, comprise a restrictive start-up process that may only be triggered by a limited group of users. As an alternative, it is also possible that the safe mode mandatorily provides a method for a secured start-up of the computer system, as described above, if the measures described here are executed during such a method.

The following further step may be performed after the complete new start-up after the restart of the computer system:

verifying whether the temporary file system key stored within the second storage area matches a loaded copy of the temporary file system key, which has been stored in the file system.

By this measure, a manipulation or modification of the temporary file system key in the second (non-encrypted) storage area of the storage may be determined. If the temporary file system key in the second storage area differs from the copy stored in the file system, the computer system may be brought in a safe mode or may be shut down again, for example, (see the explanations above). Thus, the restart process is additionally protected.

By the measures described to prepare and execute a restart process, an automated and nonetheless strictly protected process of restarting a computer system including an encrypted file system is provided. The measures mentioned above prevent or hamper in particular obtaining the temporary file system key used for the restart process.

Such a method is provided to provide measures for a secured start-up of the computer system including a file system stored in a first storage area of the storage in the computer system. The method comprises the following steps that are automatically executed during running operations of the started-up computer system:
integrating an external storage medium connected to the computer system,
generating a file system key for a later decryption of file system data of the file system stored in the first storage area of the storage,
encrypting the generated file system key,
storing the encrypted file system key on the external storage medium, and
storing a key in a second storage area of the storage in the computer system to decrypt the encrypted file system key stored on the external storage medium.

Such a method provides measures for a safe automation of a process of starting up a computer system including an encrypted file system by creating a file system key and storing the key on an external storage medium, which may be mounted during a start-up process. As a safeguard against accessing the file system key in plain text, the file system key is also encrypted and a respective key that decrypts the encrypted file system key is stored in a storage area of the storage in the computer system, which may be accessed during start-up. This way measures are provided by which a method described above comprising the safeguard mechanism and advantages described above may be implemented in a simple way. As far as advantages realized by the following examples are not described in a complementing way, reference is made to the advantages described relating to the examples of the method for a secured start-up of a computer system.

Encryption of the file system key by the method described here is advantageously executed by a cryptographic module (e.g., pgp, gnupg or dm-crypt). Such kind of cryptographic module may be the same or different to a cryptographic module that decrypts an encrypted file system key in the context of the method described above to start up a computer system in a safe mode.

The file system key may be stored in a key file together with an identifier of the external storage medium and the key file may then be stored on the external storage medium. This way, the file system key is purposely coupled with an identifier of the external storage medium.

This enforces a link of the file system key to the external storage medium. The file system key may be combined with the identifier by a dedicated combination method.

It is possible to encrypt the complete key file (and not only the file system key) on the external storage medium, thus also other data are encrypted within the key file in addition to the file system key.

In addition, a copy of the key file may be stored in the file system in the first storage area of the storage. As an alternative, the measure of that example of the method may only be applied to the file system key (and not to the complete key file). In the alternative example, a copy of the key file is stored in the file system in the first storage area of the storage. Storing a copy of the key file or of the encoded file system key in the file system in the first storage area of the storage creates a safety barrier that may be verified by the computer system including the started-up file system during a subsequent process for starting-up the computer system. This way, a manipulation of the key file or the encrypted file system key on the external storage medium used during the boot process may be detected.

The method may comprise the following further step:
verifying whether program data stored in the second storage area of the storage and required for a start-up process of the computer system match a copy of the program data stored in the file system in the first storage area.

The step may be executed as the preparation measure of the method steps described above. It is also possible to execute the step, for example, before creating the file system key, before encrypting the generated file system key or before storing a key in a second storage area of the storage within the computer system for a decryption of the encrypted file system key, which is stored on the external storage medium.

The copy of the program data of the second storage area is pre-stored in the file system in the first storage area of the storage in the computer system, and indicates the state of the program data before executing the process steps above. If the program data of the second storage area are modified in a controlled way, for example, during a software update, a new copy of the modified program data is to be stored in the file system. By the measure mentioned above an undesired modification or manipulation of the program data of the second storage area may be detected, if the verification described above does not result in an identity, that is, the program data of the second storage area differ from the copy in the file system. This represents a security barrier for verifying the integrity of program data in second storage area, before the second storage area is used for the steps of the method described above. This ensures that the key that decrypts the encrypted file system key, which is stored on the external storage medium, is not stored in a manipulated or defect second storage area of the computer system. By the verification, a secure execution of the process is ensured. If an undesired modification or manipulation of the program data of the second storage area is detected, the method may be stopped and/or the computer system may be switched to a safe mode.

The method may comprise the further step:
encrypting the file system in the first storage area of the storage by a cryptographic module, wherein a file system key is used for encryption, which matches the file system key for a later decryption of the file system data or is related hereto.

The file system key that encrypts the file system may, for example, be a first key of an asymmetric pair of keys, while the file system key for a later decryption of the file system data is a second key of an asymmetric pair of keys. As an alternative, it is possible to use a symmetric file system key for encryption and decryption of the file system.

As an alternative to the step above, the file system may already be encrypted in the first storage area (e.g., during installation of the file system or as a preparation of the methods described above). Then, only the file system key for a later decryption has to correspond to the already existing file system key, which has been used to encrypt the file system.

By an encryption of the file system in the first storage area, the computer system, in particular the data to be protected in the file system (e.g., one or more VPN keys for one or more VPN connections of the computer system to a centralized system), is protected against unauthorized access. Then, during the next start-up of the computer system a method as described above for a secured start-up of the computer system including the encrypted file system may be executed.

The configuration comprises a computer system and an external storage medium connected to the computer system. The computer system comprises a storage including a first storage area and a second storage area. In the first storage area an encrypted file system is stored. In the second storage area the required program data for a start-up process of the computer system are stored. On the external storage medium, a file system key that decrypts file system data of the file system stored in the first storage area of the storage is stored, wherein the file system key is encrypted on the external storage medium. Furthermore, in the second storage area of the computer system a key is stored, which is provided to decrypt the encrypted file system key stored on the external storage medium. The computer system is adapted to load the encrypted file system key from the external storage medium into the computer system, decrypt the encrypted file system key by the key stored in the second storage area of the computer system and finally encrypt and load file system data of the encrypted file system, as appropriate, by the decrypted file system key.

The configuration is advantageously adapted to execute a method of the kind described above. Any advantageous examples, aspects and modifications of the method described above may be examples, aspects and modifications of a configuration, which is specifically adapted hereto and vice versa.

This comprises the usage of an external storage medium for a method of the kind described above. Here, a file system key that decrypts file system data of an encrypted file system in a computer system is stored on the external storage medium, wherein the file system key itself is encrypted on the external storage medium.

Advantageous aspects and examples will be disclosed in the following description of the figures by a plurality of figures.

In the following, various methods are described for a computer system including an encrypted file system. The description of the method is made by example of the Linux system including the cryptographic module "dm-crypt" and the key management program LUKS. In addition to "dm-crypt" also further cryptographic modules (e.g., gnupg) may be used. Of course the methods may also be applied to other systems.

In the following, the term "/boot" refers to a non-encrypted storage area of the storage in the computer system used for an initial boot process of the computer system and in which the program data required for the start-up process are stored.

The term "/" denotes a storage area of the storage, in which the encrypted file system is stored.

The computer system may in particular be set up and used to establish a connection to a centralized system to be able to access the centralized system. Such a connection may be established via one or more VPN connections. One or more VPN keys may be stored in the encrypted file system that are used to set up a connection to the centralized system via the one or more VPN connections. An encryption of the file system here protects not only the VPN keys, but also an operating system of the computer system against manipulations.

FIG. 1A shows a schematic diagram of method steps of a method of providing measures for a secured start-up of the computer system.

In a first step A1 the computer system is started and booted in "/boot". To start the computer system a start-up process is triggered by accessing the storage area "/boot", where the required program data are stored. Access to the storage area "/boot" may, for example, be executed by a BIOS. The program data stored in the storage area "/boot" comprise a so-called boot loader (in Linux, for example, the so-called "Grand Unified Boot Loader", acronym "GRUB") and operating system data of an operating system kernel, in this configuration the actual Linux kernel, for example. For example, the operating system kernel is stored in a so-called "cpio-archive" ("cpio" stands for "copy in, copy out") in "/boot". During a start-up process, the cpio archive may be extracted and loaded on an initial RAM disk (in Linux the minimum program "initramfs"). After loading and executing the program data required for the start-up process, thus a running operating system kernel is present.

In this phase, in a step A2, a query and input of a password is executed, which is required to be able to access the encrypted file system in the storage area "/". The password is, for example, queried by "dm-crypt" in the so-called "Device Mapper" in the Linux operating system kernel. The password is also used for configurations and inputs via the console from the running file system in "/". The password may be managed by the key management LUKS and may be used by using the command "cryptsetup luksOpen". In step A2 a password is entered by a user (e.g. via the console). By setting the password in LUKS, the file system, stored and encrypted in "/", may be decrypted as required. That means that either the complete file system is decrypted or, alternatively only file system data of the encrypted file system are decrypted and loaded, which are requested due to an access request to the file system by the operating system kernel. The latter is preferred regarding performance aspects of the computer system.

By decrypting and loading file system data of the encrypted file system by the password set in LUKS, the computer system may finally be booted in step A3 in "/", whereby the computer system is completely started up.

In step A4 an external storage medium connected to the computer system for the purposes described in the following is mounted, that is, integrated in the running file system "/" of the started-up computer system. The external storage medium may, for example, be connected by a user to the computer system, that is plugged-in, put in, or connected to the computer system. In the example of the method described in FIG. 1A, the external storage medium is a USB stick. Alternatively, the external storage medium may, for example, also be an SD-storage card. By mounting the USB stick in step A4, the running computer system thus has access to the USB stick.

In step A5 it is verified whether the data in the storage area "/boot" match a copy of the data, which have been created before (e.g. during preparation of the method described) and has been stored in "/". This may be performed by the command "diff—r", for example. In step A5 it may be detected, whether the files in "/boot" have been modified after the copy in "/" has been created.

In this respect, it may be detected, whether the data in "/boot" have been modified in a manipulative way to impact the following process in a manipulative way.

Regarding step A5, during a deliberate and intended modification of the data in "/boot", for example, during a software update, a new copy of the modified data is to be created and stored in "/" while the computer system is started-up and running. It is possible that after a software update, the data in "/boot" is automatically replaced by the data in "/" and afterwards a copy of the data in "/boot" is stored in "/". Thus, the data in "/boot" always automatically correspond to the purposely caused system state, which is stored in the respective copy in "/". As an alternative, the system may be stopped, when the data in "/boot" differ from the copy in "/" after a software update. In this case it may be possible to trigger a verification of the data in "/boot" by a user and to manually store a copy of the data in "/boot" in "/". Both variants have advantages and disadvantages, respectively. It is possible to provide a selection option for a user to select the one of both options that is more advantageous regarding the respective field of use. In each instance, a query is to be performed before replacing data in "/boot".

In a step A6 it is verified, whether or not the data in "/boot" match the copy, which is stored in "/". If data are not identical, a manipulation is assumed, whereby the method is canceled. The computer system may then be shut down, for example. As an alternative, it is also possible to switch the computer system in a safe mode, in which only predetermined users may access the computer system, for example, to perform required actions at the computer system.

If however, the data received in step A5 is identical, the method will be continued in step A7 and a file system key is generated. The file system key is used for a later decryption of file system data of the encrypted file system, which is stored in "/". In the key management program LUKS, additional keys may be defined in addition to the password queried in step A2 above. In general, n keys may be defined in LUKS. If the password queried in step A2 and possibly a placeholder for changing the password or storing a temporary key (as will be described by FIG. 3A later) is taken into account, thus n-2 additional keys may be defined in LUKS. For n=8, 6 additional keys may be defined, for example.

It is thus possible to create a plurality of different file system keys in step A7. The file system key(s) may be created according to a predetermined cryptographic method. For example, encryption methods according to the Advanced Encryption Standard (AES, Rijndael), Twofish, MARS, RC6 or Serpent are possible. Information regarding the created file system key(s) is then stored in LUKS, thus during a later query of the file system key(s), an identification, assignment and processing of the set file system key(s) may be performed.

For ease of explanation, it is assumed in the following that a single file system key is generated in step A7.

FIG. 1B explains further steps of the method in a schematic way, which continue the measures of FIG. 1A. In a step A8, the generated file system key is combined with an identifier of the used USB stick. The identifier of the USB stick may, for example, be the serial number of the USB stick. In addition to the identifier also an arbitrary string (e.g. a name of the USB stick and/or a name of an assigned user) may be used, as appropriate. The file system key is combined with this kind of information. Hereto different combination methods are possible. For example, the identifier of the USB stick and other information, where appropriate, are appended to the file system key as a bit word. However, as an alternative it is possible to use specific aleatoric methods to generate a string from the file system key and the identifier of the USB stick in combination with additional specified information, as appropriate. It is also possible to use random numbers to increase the entropy of such a combination and protect them against brute-force-attacks, for example. In this context, those skilled in the art will know a variety of methods, which are not described here in detail.

The file system key is integrated in a key file in combination with the identifier of the USB stick and together with further described information, where appropriate.

After step A8, regarding a further protection of the method, the measure as described in steps A5 and A6 may be performed again to verify the integrity of the data in "/boot" again. For a further explanation of the measure please refer to the description above.

Finally, in a step A9 the key file is additionally encrypted by a public key of an asymmetric encryption method that has been provided hereto. Thus, the key file contains the file system key that has been generated before, wherein the key file is encrypted itself. As an alternative to the asymmetric encryption method, a symmetric encryption method may also be used. Encryption of the key file may be executed by dm-crypt or another cryptographic module such as gnupg.

In step A10 the encrypted key file is stored on the USB stick. In addition, a copy of the encrypted key file is stored in "r". This constitutes a further protection measure as will be described in detail in the following with reference to FIG. 2B.

In step A11, the public key by which the key file has been encrypted in step A9, is stored together with a corresponding private key in "/", when the public key and/or the private key are not already stored in "/" (e.g., during preparation of the method). In addition, in step A2 the private key is also stored in "/boot". By these measures, the private key is stored both in "/" and also in "/boot", which corresponds to the public key by which the key file has been encrypted in step A9. Further, the private key is used for a later re-decryption of the encrypted key file, as will be described referring to FIGS. 2A and 2C. When a symmetric encrypting method is used, only one key for a later decryption of the encrypted key file is stored in "/boot" and "/".

Finally, in step A13, the file system is encrypted in "/", if it has not already been encrypted before (e.g. during installation or during preparation of the methods). It is possible to encrypt only the file system data of the file system, or as an alternative the complete storage area "/" (the complete partition). An encryption of the file system may be performed by a symmetric or asymmetric encryption method. In a symmetric encryption method, it is possible to encrypt the file system by a master key. In an asymmetric decryption method it is possible to encrypt the file system by a first master key (public key), wherein a second master key (private key) may be provided for the subsequent decryption of the file system. When a symmetric encryption method is used, the master key may be identical with the generated file system key or may be generated therefrom, thus, for a later re-decryption of the file system, the master key may be regenerated from the applied file system key. In addition, it is possible that the master key differs from the file system key and is itself encrypted after encryption of the file system with the file system key and is stored in an encrypted way, for example, in LUKS. In that configuration, the encrypted master key may be decrypted for a later re-decryption of the file system by the applied file system key and may be applied itself for a decryption of the file system. Similar configurations are possible for an asymmetric encryption method regarding the second master key (private key).

After performing step A13, the file system is encrypted in "/". Afterwards, all temporarily generated files (in particular, temporarily generated key files) are to be stored in an encrypted area (e.g., in "/"), on a RAM disk or are to be deleted. Afterwards, the computer system may, for example, be shut down, whereby the method ends.

By the measures referring to FIGS. 1A and 1B, a method for a secured start-up of the computer system including an encrypted file system may be provided or prepared.

In the following method steps for a secured start-up of the computer system including a respectively encrypted file system will be described in detail.

FIG. 2A shows a schematic diagram of method steps of such a method for a secured start-up of the computer system.

In a step B1 the shutdown computer system is started by booting in "/boot". The step B1 may be executed similar to step A1, as has been described above regarding FIG. 1A. A further explanation is omitted.

In step B2 according to FIG. 2A it is verified, whether the start-up of the computer system is a restart (a so-called reboot from the running system, that is, a shutdown and subsequent restart). If this is the case, the method is continued according to the steps described in FIG. 3B. Such kinds of measures will be described in detail in the following with reference to FIG. 3B. If there is no such kind of restart, but a startup of the computer system from an initially shut-down state, the next step is B3 according to FIG. 2A. In step B3, a USB stick is connected to the computer system and mounted. This step is similar to step A4, as has been described above relating to FIG. 1A, and a further explanation is omitted.

In step B4 the encrypted key file is loaded from the so-called USB-stick and is decrypted by the private key, which is stored in "/boot" (see step A12 of FIG. 1B). A decryption of the encoded key file may be performed by using dm-crypt or another cryptographic module as, for example, gnupg. It is possible to perform the decryption of the encrypted key file by the cryptographic module, by which the key file has been encrypted before (see step A9 in FIG. 1B). Alternatively decryption of the encrypted key file is performed by a cryptographic module that differs from the one by which the key file has been encrypted before. In the following, in step B5 an extraction of the combination of the file system key and the identifier of the USB stick (and additional stored information, as appropriate) from the key file is performed (see hereto step A8 of FIG. 1B).

In step B6 an extraction of the file system key and the identifier of the USB stick and possibly additional stored information from the extracted combination is performed. After performing step B6, at least the file system key and the identifier of the USB stick and possibly additional information (e.g., an arbitrary string, a name of the stick and/or a name of the assigned user or the like) are thus provided.

As a USB stick is connected to the computer system, the file system key stored in the encrypted key file can be encrypted in an automated process. Thus, it may be used in plain text in the further process flow. The process is facilitated by a combination of the used USB stick with the private key stored in the storage area "/boot" to decrypt the encrypted key file on the USB stick.

In a further step B7 according to FIG. 2A, it is verified whether the identifier, which has been extracted from the key file according to steps B5 and B6, matches an actual identifier of the USB stick, which has been determined by mounting the USB stick (see step B3 above). For example, the serial number of the used USB stick, which has been stored or which has actually been determined, is verified. By the verification step B7 it may then be determined, whether the actual identifier of the used USB stick matches the identifier stored in the key file. This way it may be detected whether the key file has been copied to another USB stick. In the latter case, the identifier stored in the key file differs from the actual identifier of the used USB stick.

Step B7 thus ensures that exactly the USB stick is used that has been used before during preparation of the method (during the method according to FIGS. 1A and 1B). Step B7 may be manipulated in a way that the key file has been manipulated and the identifier stored therein has been forged. Thus, the identifier matches the actual identifier of the used USB stick (alien stick). Another manipulation possibility might be that the verification step B7 itself is removed or circumvented during execution of the start-up process in the storage area "/boot". For such kind of manipulations, the usage of an alien USB stick would not be detected or the control would fail in step B7. However, to forge an identifier stored in the key file, a decryption of the key file by the private key stored in "/boot", would be required. Hereto an access to "/boot" would be required. This may, for example, be prevented or at least hampered by setting a hard disk password and/or a BIOS password.

In FIG. 2B, further steps of the method according to FIG. 2A are shown.

In step B8 a query is executed whether or not the verification of step B7 (see FIG. 2A) has resulted in an identity. If the matched identifiers are not identical, this results in a cancellation of the method. Alternatively, the computer system may, for example, be switched to a safe mode (see the explanations above regarding step A6 in FIG. 1A).

However, if step B8 results in an identity of the compared identifiers (this means, that it is not assumed that the key file was manipulated and/or an alien USB stick has been used), the method proceeds to step B9. In step B9 the file system key that has been decrypted or extracted from the encrypted key file is used to decrypt file system data. In particular, the file system key is set in a cryptographic module (in this example of the method dm-crypt), which has been set up during the start-up process, that is, loaded and executed. This may be performed by using the command "cryptsetup luksOpen".

By setting the file system key in LUKS, it may be verified whether the used file system key is valid and/or corresponds to the information or parameters stored in LUKS. This also prevents or hampers the usage of a non-authorized or manipulated file system key. In LUKS, the file system key may be used to decrypt an encrypted master key, for example. By the master key that has been decrypted in this way, the file system data of the encrypted file system may be decrypted and loaded in "/", where appropriate. Alternatively, it is possible that the file system key itself acts as master key that decrypts respected file system data. It is further possible to regenerate the master key, which is required to decrypt the file system data from the file system key in LUKS. Thus, the file system data may be decrypted by using the regenerated master key. Depending on the example of an encryption of the file system that has been performed before (see the descriptions regarding step A13 in FIG. 1B above), a variety of alterations and modifications of the described method are possible.

By setting the file system key in step B9, finally the file system data of the encrypted file system is decrypted and loaded, whereby the computer system is booted in "/" and will be completely started up in step B10. Thus, after step B10 is completed, the computer system is thus completely started up and comprises a running file system (at least partially available in plain text). It is possible to further protect the running file system due to security reasons in a way that a user is not able to authenticate herself/himself or to log onto the running file system. It may be possible that the started-up computer system automatically executes predetermined actions or tasks, for example, establishing a secure connection to a remote server. Alternatively, it is possible to allow only limited user actions, e.g. controlled by the command "sudo" in Linux to initiate predetermined actions or tasks.

For a further protection of the method, further verification steps may be subsequently performed. Hereto, in step B11, the USB stick is again mounted by the completely started-up computer system and integrated into the running file system. A mounting of the USB stick may be omitted, where appropriate, if the USB stick is still integrated by step B3 according to FIG. 2A. This depends on the architecture and implementation of the operating system used and possibly also on the hardware used. Besides mounting, reading the USB stick may be performed also by any other appropriate measures.

In step B12 the encrypted key file is reloaded from the USB stick in the now running file system and its identity is verified against a copy, which is stored in "/" (see step A10 in FIG. 1B). In verification step B12 it may be determined whether the key file on the used USB stick differs from an image (copy), which has been created during preparation of the method (see FIGS. 1A and 1B). This way it may be detected whether the key file on the used USB stick has been manipulated.

After the file system in "/" exists at least before the decryption of file system data, when required, in steps B9 or B10 only in an encrypted way in the storage of the computer system, forging a copy of the key file stored in "/" is not possible, extremely complicated or very unlikely. In this respect, the step B12 may only be forged in a way that the copy stored in "/" has been manipulated or deleted. However, this is extremely complicated, as described above.

Due to the verification step B12, a manipulation of the key file loaded from the USB stick may be detected if it is different from the copy stored in "/". In this respect, step B12 further protects the method, even if, for example, a verification has failed in step B7 according to FIG. 2A, as described above.

A result of the verification step B12 is queried in step B13. If the key files, which have been compared to one another, differ and thus no identity is given, this results in a cancellation of the method.

Regarding this, see also the explanations referring to step B8 or A6 in FIG. 1A. Otherwise, if there is an identity, it is verified in step B14 whether the data in "/boot" match a copy, which is stored in "/".

The step B14 may be executed similar to step A5, as has been described above referring to FIG. 1A. Thus, a further explanation is omitted here. The evaluation of the result in step B15 is similar to step A6, as has been described referring to FIG. 1A. Also, a further explanation is omitted here.

FIG. 2C shows further method steps of the method according to FIGS. 2A and 2B in a schematic way. In step B16 a decryption of the copy of the encrypted key file, which is stored in "/", is performed by the private key, which is stored in "/" (see also steps A10 and A11 of FIG. 1B). In the further steps B17 to B20, an extraction of the identifier of the USB stick, which is extracted from the copy of the encrypted key file, and a verification of the identity thereof with an actual identifier which has been identified by mounting the USB stick by the running file system, is performed. In this respect, steps B17 to B20 correspond to steps B5 to B8, as has been described above referring to FIGS. 2A and 2B. In that respect, the verification steps are again applied to the copy of the encrypted key file stored in "/". This is a further security check by the running system.

As has been described above referring to step B12, the copy of the encrypted key file in "/" will be at least encrypted before performing steps B9 and B10 according to FIG. 2B. That means, it is extremely difficult to perform a modification or manipulation of the copy of the encrypted key file, which is stored in "/", if at all. The copy of the encrypted key file represents an image of the key file during setup of the method on the computer system, as described above. In this respect, the copy of the encrypted key file also includes the identifier of the USB stick used to set up the method. Even if all verification mechanisms have failed or been circumvented by manipulation, which has been performed before step B16, by a verification according to steps B17 to B20, a manipulation of the key file on the USB stick may yet be detected.

If the verification in step B19 does not result in an identity of the matched identifiers, the method may be canceled in step B20. Here, a manipulation (or an erroneous deviation) of the key in relation to the image of the encrypted key file stored in "/", has to be assumed. However if the verification in step B20 results in an identity, further actions may be initiated in step B21, where appropriate. This kind of additional actions may, for example, include provision of a log-on mask at a console. Thus, a user may log onto the completely started-up computer system and perform predetermined further actions. It is also possible to abandon restrictive actions that limit users that have been described referring to step B10 above. Then, the method is completed.

FIG. 3A shows a schematic diagram of method steps of a method for a safe restart of the computer system. The method may be a separate method or may be performed in combination with the methods described in FIGS. 1A to 2C. The term "restart" means that the computer system is shut down from running operations, is switched off and then runs through a restart process and starts up again. Thus, a restart differs from a start of the computer system in which the computer system is initially switched off and started up from the switched off state by a start-up process. The method will be described by example with reference to a Linux system. Of course, the method may also be applied to other systems.

According to FIG. 3A, the method starts in step C1, while the computer system is executed with a started-up and running file system in a first storage area "/". In step C2, a time window is determined having a predetermined start time and a predetermined end time, which defines the predetermined time period for performing a restart of the computer system. For example, the time window may indicate that a restart of the computer system has to be performed within the next 1 to 3 minutes. The predetermined time window is stored in "/".

In step C3 a temporary file system key is generated and stored in "/". The temporary file system key assumes a similar function as a file system key according to the method of FIGS. 1A to 2C, except that it is only used temporarily for a restart of the computer system to decrypt an encrypted file system of the computer system after the restart, which is stored in "/". The temporary file system key is further defined in the key management LUKS, and information regarding the temporary file system key is stored. This may, for example, be performed in LUKS in a placeholder, which is set up in a key table in a dedicated way. The temporary file system key may be defined in LUKS by using the command "cryptsetup luksAddKey".

In step C4 the temporary file system key is further stored in the second storage area "/boot", in which program data required for the start-up process are stored. Then, a restart of the computer system is triggered in step C5. This may, for example, be performed by using the command "/sbin/reboot". Then, in step C6 the computer system is restarted by booting in "/boot". The step C6 basically corresponds to steps A1 from FIG. 1A or B1 from FIG. 2A, and a further explanation will be omitted here.

In FIG. 3B further steps of the method according to FIG. 3A are shown. In step C7 the temporary file system key stored in "/boot", is set for a decryption of file system data in LUKS. This procedure corresponds to the measures of step B9 according FIG. 2B, and a further explanation is omitted. Then, in step C8 file system data are decrypted and loaded. Thus, the computer system may completely start up after the restart and boots in "/". This step corresponds to step B10 in FIG. 2B. After step C8, the computer system is completely started up after the restart and provides the running file system again.

In step C9 the identity of the temporary file system key stored in "/boot" is verified in relation to the copy, which is stored in "/" (see step C3 in FIG. 3A). Here, it has to be checked at first whether the temporary file system key exists in "/boot". Then, the temporary file system key is copied from "/boot" in "/", if it has been detected in "/boot". Then, the temporary file system key may be deleted in "/boot". Further, it is verified whether the copy of the temporary file system key exists in "/". If this is the case, it is verified whether the temporary file system key, which has been copied from "/boot" to "/", matches the copy of the temporary file system key, which is pre-stored in "/".

Thus, in step C9 it may be verified, whether the temporary file system key stored in "/boot", matches the temporary file system key that was created before the restart. If this is not the case, a manipulation of the temporary file system key stored in "/boot", is assumed. This result causes a cancellation of the method in step C10 (see also steps A6 in FIG. 1A, B13 and B15 in FIG. 2A, and B20 in FIG. 2C). However, if the compared temporary file system keys are identical, the temporary file system key may be removed again from the key management LUKS. This may, for example, be performed by using the command "cryptsetup luksRemoveKey".

In step C11 it is verified, whether the current system time, which has been determined during the restart, lies within the predetermined time window (see step C2 in FIG. 3A).

The condition is verified in FIG. 3C in step C12. If the predetermined time window is not met, the method will be canceled. See also steps A6, B13, B15, B20, and C10, as described above.

In this case, it has to be assumed that the restart has not been performed fast enough. In this case a manipulation of the restart is to be assumed, which required some time. Thus, the predetermined time window was exceeded. Such a kind of manipulation may, for example, be possible to obtain the temporary file system key, which is used for the restart, to decrypt the encrypted file system. This may be feasible, for example, when the computer system is just switched off or when it is shut down for a restart. In this case, for example, the storage of the computer system may, for example, be removed and copied, as appropriate. Thus, the storage may be decrypted by the temporary file system key obtained from "/boot".

To prevent this kind of manipulation, it is possible that an authorized person monitors the restart. Furthermore, the device is to be sealed, to make a removal of the storage (e.g., the respective mass storage) difficult or to make it at least replicable. In addition, a BIOS password may be set to prevent manipulations of the time of the computer system to manipulate the predetermined time window (see step C2 in FIG. 3A).

However, if the verification of the predetermined time window has been successful, it is to be assumed that the method has been performed correctly, that is, that the restart has been executed fast enough, thus it is not assumed that the restart has been manipulated.

In this case, additional actions may be initiated in step C13. This may, for example, comprise deleting any created copies of temporary file systems keys and of the predetermined time window. It is also possible to verify again whether the files in "/boot" match a copy in "/" (see, for example, steps A5 in FIG. 1A, or B14 in FIG. 2B). Subsequently, the method is completed.

The described methods enable a secured start-up of a computer system including an encrypted file system or a preparation of measures for such methods. The mentioned processes may be executed in a completely automated way. In particular, by combining an external storage medium, on which an encrypted file system file to decrypt the decrypted file system in the computer system is stored, with a decryption of the encrypted file system key during a start-up process of the computer system and subsequently using the file system key, a safe, but yet very comfortable process of booting the computer system is implemented. By additional verification processes of the kind described, the process may in addition be protected in a very efficient way.

Configuration options for preparing and/or setting and/or performing any measures and process steps may be facilitated by a console (command line) and/or a graphical user interface (GUI). This way, for example, also external storage media, file system keys or key files or other parameters, which are stored thereon, may be managed (e.g., by adding or deleting a used USB stick).

The shown specific examples of the described methods, configurations and usages are only of exemplary nature. Referring to the described methods, for a single or all verification mechanisms of identities of matched information or other conditions, the following measures may be applied in combination, as appropriate, if the respective verification results in a deviation of the matched information:
the method is canceled,
the computer system is switched in a safe mode,
an entry is written into a log file,
temporary files are deleted and/or stored in a backup
certain actions (as, for example, generation or modification
  of a file system key or of a key file) are only performed,
  if an online monitoring is existing.

In general, the individual steps of the method and/or occurring events are to be logged in a log file.

In further optional examples of the methods presented here, it may be possible that any data stored on the external storage medium are again encrypted in addition to the measures mentioned above and require a respective input of a password (e.g. via a keyboard), by which a decryption of this additional encryption is initiated.

The invention claimed is:

1. A method for a secured start-up of a computer system including an encrypted file system stored in a first storage area of a storage in the computer system, wherein the method comprises steps automatically executed during start of the computer system:

triggering a start-up process of the computer system by accessing a second storage area of the storage in which the program data required for the start-up process are stored, loading and executing the program data required for the start-up process from the second storage area, mounting an external storage medium that is connected to the computer system, wherein a file system key that decrypts the file system data of the encrypted file system is stored on the external storage medium, wherein the file system key is encrypted on the external storage medium, loading the encrypted file system key from the external storage medium into the computer system, decrypting the encrypted file system key by a key stored in the second storage area, setting the decrypted file system key in a cryptographic module established by the start-up process, and decrypting and loading file system data of the encrypted file system by the cryptographic modules by the set file system key, whereby the computer system is started up completely, wherein the file system key is stored on the external storage medium in a key file that includes an identifier of the external storage medium in addition to the file system key, the key file is loaded from the external storage medium into the computer system, and a verification is performed whether the identifier of the external storage medium included in the key file matches an actual identifier that was determined by mounting the external storage medium, wherein, after a complete start-up of the computer system, further steps are performed:

loading a copy of the key file stored in the file system, verifying whether the key file loaded from the external storage medium matches the loaded copy of the key file, extracting an identifier of the external storage medium from the loaded copy of the key file, and verifying whether the identifier that was extracted from the loaded copy of the key file matches the actual identifier, which has been determined by mounting the external storage medium, which is connected to the computer system, in the started-up file system.

2. The method according to claim 1, wherein, after complete start-up of the computer system, a following further step is performed:

verifying whether the program data in the second storage area match a copy of the program data of the second storage area stored in the file system in the first storage area.

3. The method according to claim 1, wherein, after complete start-up of the computer system, following further steps are performed to prepare a restart of the computer system:

determining a time window having a predetermined start time and a predetermined end time and storing the time window in the file system, generating a temporary file system key to decrypt encrypted file system data of the file system after a restart of the computer system, storing the temporary file system key in the second storage area, and triggering a restart of the computer system.

4. The method according to claim 3, wherein, before triggering a restart of the computer system, a copy of the temporary file system key is stored in the file system.

5. The method according to claim 3, wherein, by triggering a restart of the computer system, following further steps are performed:

shutting down the file system, whereby the file system is completely encrypted and stored in the first storage area, re-triggering the start-up process of the computer system by accessing the second storage area, in which the program data required for the start-up process are stored, loading and executing the program data required for the start-up process from the second storage area, loading the temporary file system key from the second storage area, setting the loaded temporary file system key in a cryptographic module set up by the start-up process, decrypting and loading encrypted file system data of the file system by the cryptographic module by using the set temporary file system key, whereby the computer system is started-up completely, reading the current system time of the computer system, and verifying whether the current system time lies within the determined time window, which has been loaded from the file system.

6. The method according to claim 4, wherein, after complete new start-up after the restart of the computer system, a following further step is performed:

verifying whether the temporary file system key stored within the second storage area matches a loaded copy of the temporary file system key, which is stored in the file system.

7. A method of providing measures for a secured start-up of a computer system including a file system stored in a first storage area of a storage in the computer system, wherein the method comprises steps automatically executed during running operations of the started up computer system:

mounting an external storage medium connected to the computer system, generating a file system key for a later decryption of file system data of the file system, which is stored in the first storage area of the storage, encrypting the generated file system key, storing the encrypted file system key on the external storage medium, and storing a key in a second storage area of the storage in the computer system for decrypting the encrypted file system key, which is stored on the external storage medium, wherein, during a next startup of the computer system a method comprising a method for a secured start-up of a computer system including an encrypted file system stored in a first storage area of a storage in the computer system, wherein the method comprises steps automatically executed during start of the computer system:

triggering a start-up process of the computer system by accessing a second storage area of the storage in which the program data required for the start-up process are stored, loading and executing the program data required for the start-up process from the second storage area, mounting an external storage medium that is connected to the computer system, wherein a file system key that decrypts the file system data of the encrypted file system is stored on the external storage medium, and the file system key is encrypted on the external storage medium, loading the encrypted file system key from the external storage medium into the computer system, decrypting the encrypted file system key by the key stored in the second storage area, setting the decrypted file system key in a cryptographic module established by the start-up process, and decrypting and loading file system data of the encrypted file system by the cryptographic modules by the set file system key, whereby the computer system is started up completely, will be performed.

8. The method according to claim 7, wherein the file system key is stored together with an identifier of the external storage medium in a key file, and the key file is then stored on the external storage medium.

9. The method according to claim 8, wherein a copy of the key file is stored in the file system in the first storage area of the storage.

10. The method according to claim 7, further comprising:
verifying whether program data stored within the second storage area of the storage and required for a start-up process of the computer system match a copy of said program data, which is stored in the file system in the first storage area.

11. The method according to claim 7, further comprising:
encrypting the file system in the first storage area of the storage by using a cryptographic module, wherein a file system key is used for encryption which matches the file system key for a later decryption of the file system data or is related hereto.

\* \* \* \* \*